Feb. 5, 1957 W. SIX ET AL 2,780,674

CIRCUIT-ARRANGEMENT FOR ENGAGING AN APPARATUS

Filed July 19, 1951 4 Sheets-Sheet 1

INVENTORS
WILLEM SIX
JACOBUS DOMBURG
BY [signature]
AGENT

CIRCUIT-ARRANGEMENT FOR ENGAGING AN APPARATUS

INVENTORS
WILLEM SIX
JACOBUS DOMBURG

BY Fred M Vogel
AGENT

CIRCUIT-ARRANGEMENT FOR ENGAGING AN APPARATUS

INVENTORS
WILLEM SIX
JACOBUS DOMBURG
BY [signature]
AGENT

Feb. 5, 1957 W. SIX ET AL 2,780,674

CIRCUIT-ARRANGEMENT FOR ENGAGING AN APPARATUS

Filed July 19, 1951 4 Sheets-Sheet 4

INVENTORS
WILLEM SIX
JACOBUS DOMBURG

BY [signature]
AGENT

United States Patent Office 2,780,674

Patented Feb. 5, 1957

2,780,674

CIRCUIT-ARRANGEMENT FOR ENGAGING AN APPARATUS

Willem Six and Jacobus Domburg, Eindhoven, Netherlands, assignors to Hartford National Bank and Trust Company, Hartford, Conn., as trustee Application July 19, 1951, Serial No. 237,514

Claims priority, application Netherlands August 8, 1950

9 Claims. (Cl. 179—18)

The invention relates to a circuit-arrangement for use in an automatic signalling system, for example an automatic telephone system for engaging an apparatus of a first kind by means of one of a plurality of apparatus of a second kind and for establishing an intelligence connection between the two apparatus.

Such circuit-arrangements are used in telephone systems as preselectors for connecting a calling line to a connecting circuit, as group selectors for connecting a connecting circuit or a preceding group selector to a following group selector or a final selector, or as final selectors for establishing a connection between a connecting circuit or a group selector and a line called.

Call finders and selector switches are known in which an intelligence connection is established with the use of electronic means, for example a cathode-ray tube operating as a selector switch. In practice such electronic connecting means exhibit comparatively high internal resistances, so that the intelligence currents are considerably attenuated and, as a rule, amplifying means are required, which give rise to particular difficulties, since the intelligence currents must be transmissible in both directions.

A circuit-arrangement is furthermore known in which use is made of a gas-filled tube to serve as a switching contact for completing an intelligence circuit.

In circuit-arrangements of the kind referred to above an apparatus of the first kind may, in principle, be engaged by various apparatus of the second kind. However, if the apparatus of the first kind has been engaged, it must no longer be engageable by an apparatus of the second kind, since otherwise an unwanted connection would be established. It must not be possible, for example, for a subscriber to call an engaged subscriber. In order to distinguish between the engaged condition and the non-engaged condition of an apparatus of the first kind, the latter is provided, in known circuit-arrangements, with a marking point which, in the non-engaged condition of the apparatus, has a particular value of voltage which is varied as soon as the apparatus is engaged. It has been suggested to derive the busy criterion from the voltage of an intelligence conductor. Before the apparatus is adapted to be engaged, the value of voltage of the marking point is tested by the apparatus of the second kind.

In the circuit-arrangement according to the invention the wanted intelligence connection is established through a gas-filled tube. Here a multiple-wired point of the apparatus of the first kind is coupled via a discharge path of a gas-filled tube with a multiple-wired point of each of the apparatus of the second kind and the multiple-wired point of the apparatus of the first kind is furthermore coupled through an impedance which has a finite resistance value for direct currents and of which at least a part is coupled, for intelligence currents, with an intelligence conductor in the apparatus concerned, to a first terminal of a supply source, whereas the multiple-wired points of the apparatus of the second kind are each connected through an impedance, of which at least part is coupled, for intelligence currents, with an intelligence conductor in the associated apparatus, to a second terminal of the supply source. In this case the potential difference between the terminals of the supply source must be lower than the ignition voltage of the said discharge paths of the gas-filled tubes; however, it must exceed their burning voltage. Provision is furthermore made of starting means which are adapted to produce such voltage variations across at least one of the electrodes of the gas-filled tube connected between the apparatus that this tube is adapted to ignite, if the apparatus of the first kind is not engaged. However, the tube cannot break down, if this apparatus is engaged, since the voltage drop occurring across at least part of the impedance connected between the multiple-wired point of the apparatus of the first kind and the first terminal of the supply source, if another gas-filled tube connected to this multiple-wired point is already conductive, acts upon at least one of the electrodes of the gas-filled tube concerned in a manner such that this tube cannot ignite.

Consequently, in this circuit-arrangement the voltage occurring across at least part of the impedance connected to the multiple-wired point furnishes an indication about the engagement or unengagement of the apparatus of the first kind. In contradistinction to known circuit-arrangements this marking voltage is not tested by the apparatus of the second kind, but is made use of by the gas-filled tube itself. This is particularly of importance, since it is thus possible to make an apparatus of the second kind select a free apparatus from a plurality of apparatus of the first kind in a manner such that the test of the engaged condition and the unengaged condition of all apparatus of the first kind, from which a choice is to be made, takes place at the same time, in contradistinction to known circuit-arrangements, in which the engaged conditions of the various apparatus of the first kind are tested in succession until a free apparatus has been found.

For this purpose the circuit-arrangement according to the invention may be arranged to be such that the multiple-wired point of each of the apparatus of the first kind is connected through a gas-filled tube to the multiple-wired point of each of the apparatus of the second kind, the starting means producing such a voltage variation across at least one electrode of all the gas-filled tubes connected to the apparatus of the second kind, that all the gas-filled tubes coupling this multiple-wired point with a free apparatus of the first kind could strike. The ignition of all the gas-filled tubes, with the exception of one, is, however, avoided, since the voltage drop occurring, when one of the gas-filled tubes becomes conductive, across at least part of the impedance connected between the multiple-wired point of the apparatus of the second kind and the second terminal of the voltage source acts upon at least one electrode of the gas-filled tubes connected to this multiple-wired point in a manner such that the other gas-filled tubes cannot ignite.

The circuit-arrangement according to the invention is particularly suitable for use as a preselector, as a group selector and as a final selector.

In order that the invention may be more clearly understood and readily carried into effect, it will now be described more fully with reference to the accompanying drawing, in which a few embodiments are shown diagrammatically in a simplified form.

Figs. 1, 2 and 4 show preselector circuit-arrangements for connecting a calling line to a connection circuit.

Fig. 3 refers to a preselector circuit-arrangement, in which the gas-filled tubes used as connecting members of the preselector are also used in a final selector circuit-arrangement for connecting a connecting circuit to a line called.

Figure 1:
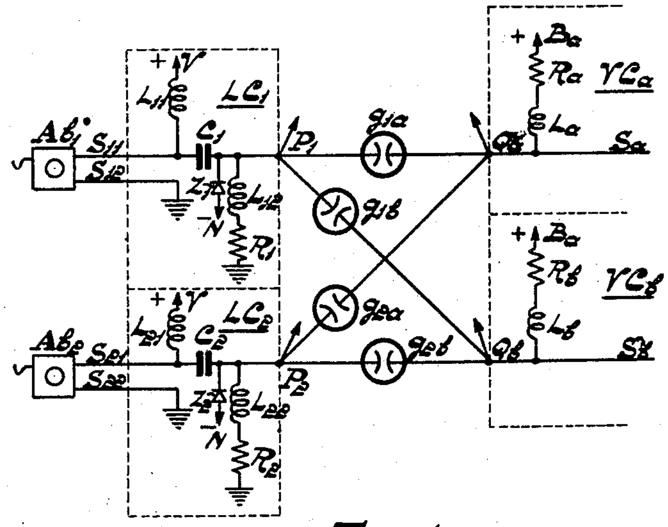

Referring to Fig. 1, $Ab_1$ and $Ab_2$ designate subscriber apparatus, which are connected through lines to intelligence conductors $S_{11}$ and $S_{12}$ and $S_{21}$, $S_{22}$ respectively, to line circuits $LC_1$ and $LC_2$ in a telephone exchange and which must be connectable, in the event of a call, to one of a plurality of connecting circuits $VC_a$ and $VC_b$. For the sake of simplicity only two line circuits and two connecting circuits are shown, but in a practical embodiment of these members will, in general, be greater and also the number of subscriber line circuits will exceed the number of connecting circuits.

To each line circuit is added a multiple-wired point $P_1$ and $P_2$, which is connected through the discharge path of a gas-filled diode $g_{1a}$, $g_{1b}$, $g_{2a}$, $g_{2b}$ respectively to a multiple-wired point $Q_a$, $Q_b$ of each of the connecting circuits $VC_a$, $VC_b$, whereas the multiple-wired points of the line circuits are furthermore connected through an inductor in series with a resistor $L_{12}$, $R_1$ and $L_{22}$, $R_2$ respectively to earth. Between the multiple-wired points $Q_a$ and $Q_b$ of the connecting circuits which are connected to the intelligence conductors $S_a$, $S_b$, of these circuits and the positive terminal $B_a$ of a supply source (not shown), of which the negative terminal is earthed, provision is made of the series combination of an inductor ($L_a$, $L_b$) and a resistor ($R_a$, $R_b$). The voltage between the terminals of the supply source $B_a$ is lower than the breakdown voltage of the discharge paths of the gas-filled tubes, but it exceeds their burning voltage. Consequently, the gas-filled tubes are alternately conductive or non-conductive. The intelligence conductors $S_{12}$ and $S_{22}$ of the subscriber lines are earthed in a direct manner and the subscriber lines are each fed through an inductor $L_{11}$, $L_{21}$ by a supply source V (not shown), of which the negative terminal is earthed. For intelligence currents, the intelligence conductors $S_{11}$ and $S_{12}$ are coupled with the multiple points $P_1$, $P_2$ of the line circuits respectively by way of capacitors $C_1$ and $C_2$ respectively.

This circuit-arrangement operates as follows. It is assumed that no intelligence communication prevails and that, consequently, all the gas-filled tubes are extinguished.

If one of the subscribers, for example $Ab_1$, removes the receiver, the loop across the intelligence conductors $S_{11}$ and $S_{12}$ is completed by way of the subscriber's apparatus and the potential of the intelligence conductor $S_{11}$ drops, so that a negative pulse is transmitted through the capacitor $C_1$ to the multiple-wired point $P_1$. Thus the potential of the discharge paths of all the gas-filled tubes $g_{1a}$, $g_{1b}$, and so on, connected to this multiple-wired point, increases in excess of the ignition voltage of these tubes. For this purpose the potential variation of the multiple-wired point must exceed the difference between the ignition voltage of the tubes and the voltage between the terminals of the supply source $Ba$. In principle, all the gas-filled tubes could break down. However, this does not occur. In practice, it has been found that with a suitable choice of the elements and the voltages, this choice being, however, not critical, invariably only one tube strikes. This is due to the fact that the properties of the tubes, such as their starting voltage and their starting speed, are never completely equal. Consequently, the tubes do not ignite simultaneously.

As soon as one of the tubes, for example, $g_{1a}$, breaks down, a rapidly increasing current begins to flow through the circuit from the positive terminal $Ba$ of the supply source, through the resistor $R_a$, the inductor $L_a$, the multiple-wired point $Q_a$, the gas-filled tube $g_{1a}$, the multiple-wired point $P_1$, the inductor $L_{12}$ and the resistor $R_1$ to earth. Thus the voltage at the multiple-wired point $P_1$ increases and the voltage across the discharge paths of the other gas-filled tubes $g_{1b}$, and so on, does not attain the value of the starting voltage, or it drops very rapidly below this value, so that these tubes cannot ignite.

The difference in starting speed may, as an alternative, be obtained by giving artificially preference to one gas-filled tube over another, which may, for example, be realized by connecting not all the multiple-wired points $Q_a$, $Q_b$, and so on of the connecting circuits to the same terminal of the supply source, as is shown in the figure, but by connecting them to different tappings of a supply potentiometer. Consequently, in this case the gas-filled tubes have different bias voltages and the gas-filled tube having the highest bias voltage will start sooner than the other tubes.

After the gas-filled tube $g_{1a}$ has become conductive, an intelligence communication is established through the discharge path between the line circuit $LC_1$ and the connecting circuit $VC_a$, through which the dial signals of the subscriber $Ab_1$ can be transmitted to the intelligence conductor $S_a$ of the connecting circuit $VC_a$ and furthermore to a register or group selector coupled therewith, if any (not shown). After the wanted communication with the subscriber called has been established, the intelligence currents through the gas-filled tube $g_{1a}$ are transmitted in both directions.

Owing to the direct current passing through the aforesaid circuit, a voltage drop occurs across the resistor $R_a$ of the connecting circuit, so that the multiple-wired point $Q_a$ has a lower potential than the multiple-wired points of the further connecting circuits. The battery voltage and the burning voltage of the gas-filled tubes may be 160 v. and 60 v. respectively, so that the voltage drop across each of the resistors $R_a$ and $R_1$ is 50 v., if these resistors are equal. Thus the connecting circuit $VC_a$ is engaged, i. e. a next following call cannot establish a connection with this connecting circuit, as long as the gas-filled tube $g_{1a}$ remains conductive.

If, for example, the subscriber $Ab_2$ takes off the receiver, the potential of the multiple-wired point $P_2$ drops. The voltage across the gas-filled tube $g_{2a}$ is then lower than that across the further tubes and the tube $g_{2a}$ is consequently in a less favourable position as far as starting is concerned, than the further tubes, so that one of these further tubes will break down.

However, it may occur that all the connecting circuits are engaged, when a subscriber calls. All the gas-filled tubes connected to the multiple-wired point of the subscriber line are then again, approximately, in equivalent conditions. If the potential drop of the multiple-wired point of the line circuit is sufficient, it may occur that, in spite of the fact that all the connecting circuits are engaged, one of the tubes will nevertheless break down. This may be avoided by taking care that the variation of the potential of the multiple-wired point of the line circuit is smaller than the ignition voltage of the gas-filled tubes, less the voltage of the supply source and increased by the voltage drop occurring across a resistor ($R_a$, $R_b$) connected to a multiple-wired point of a connecting circuit, if one of the gas-filled tubes connected to this multiple-wired point is conductive. This may, for example, be realized by connecting, as is shown in Fig. 1, the multiple-wired point P of each line circuit through a rectifier $Z_1$, $Z_2$, to a point N of negative potential in a manner such that the potential variation of the multiple-wired point is limited on the lower side.

The circuit-arrangement shown in Fig. 1 has various limitations. Thus, for example, for intelligence currents the subscriber line is not balanced against earth, which will lead to cross-talk, if a few lines extend in a common cable through a great distance.

The gas-filled tubes furthermore have a comparatively high internal resistance, so that the intelligence currents are comparatively strongly attenuated in the transmission members.

Figure 2:
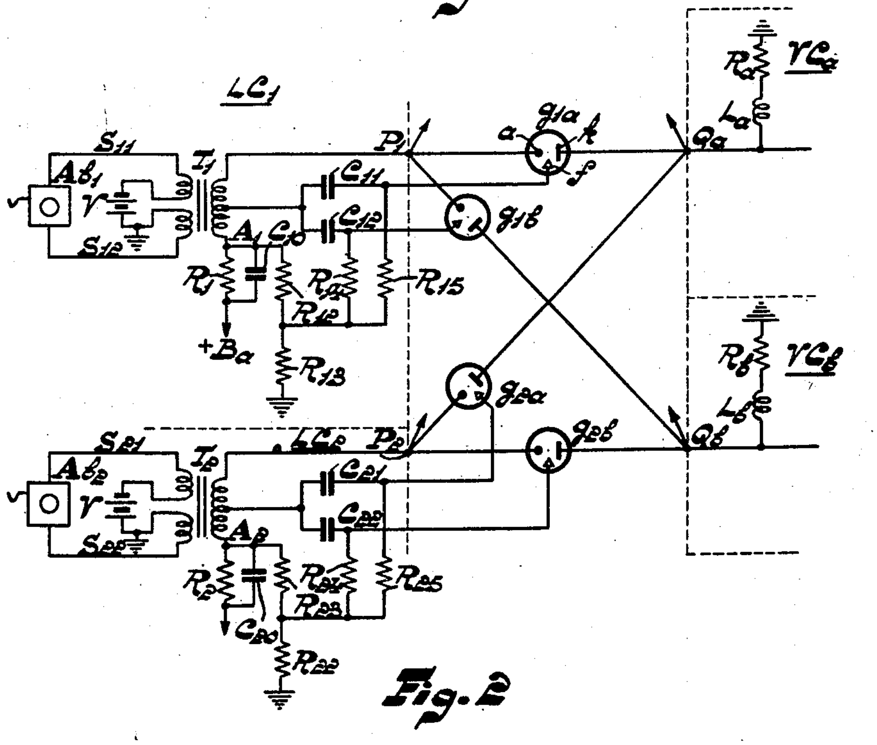
Figure 4:
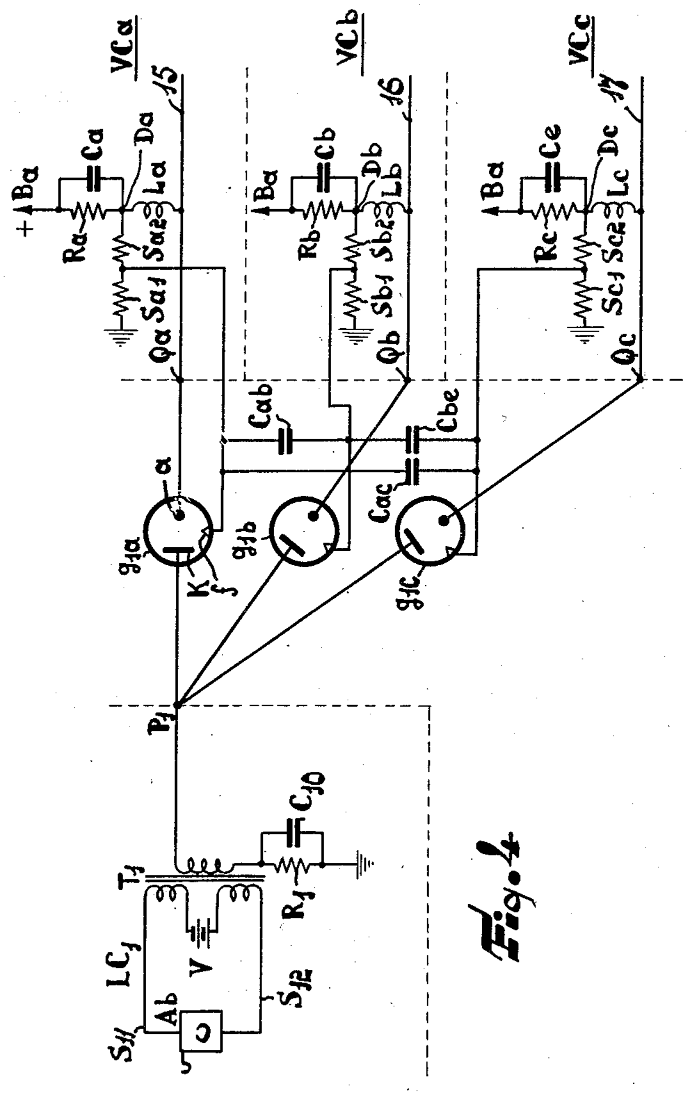
Figures 3, 6:
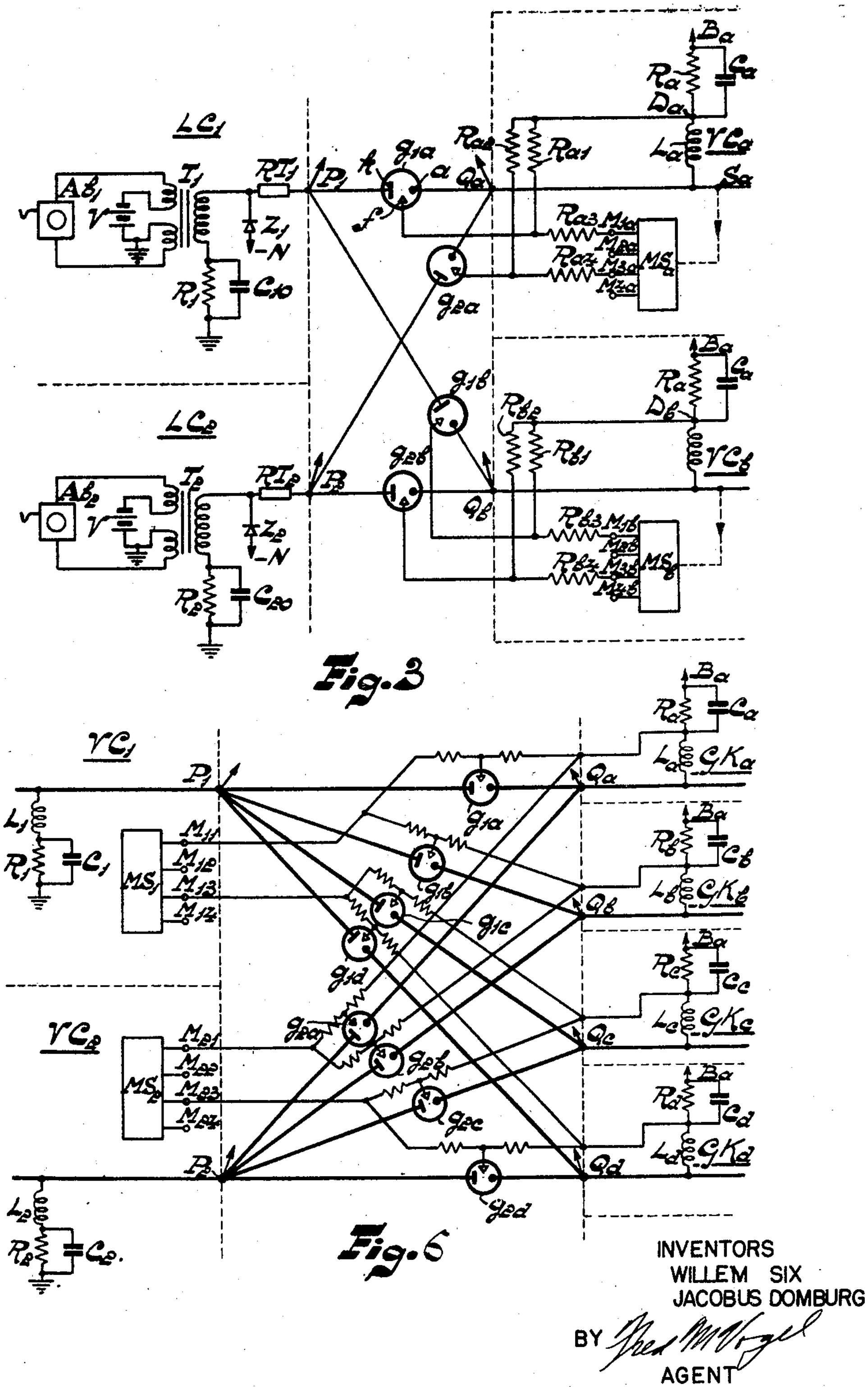
Fig. 6 shows a group selector circuit-arrangement.

These limitations may be obviated by coupling the subscriber line through transformers with the connecting means as is shown by way of example in Figs. 2, 3 and 4. It is thus permitted, on one hand, to render the subscriber line symmetrical against earth for alternating current, whilst on the other hand, by a suitable choice of the transformation ratio, the lines may be made to conform with the transmission stage.

A further limitation of the circuit-arrangement shown in Fig. 1 resides in the use of gas-filled diodes as coupling elements. It has been found that with this kind of tubes the starting voltage may vary within comparatively wide limits and inter alia strongly varies with the preceding operations, for example, upon the fact whether the tube has just been conductive or non-conductive. As a matter of course, the starting pulses must be sufficiently high to cause the gas-filled tube having the highest break down voltage to start. In this case, however, there is the risk that, if all the connecting circuits are engaged, a gas-filled tube having a low starting voltage, coupling the calling line with a busy connecting circuit, will nevertheless ignite, so that a connection will be established with a connecting circuit already engaged. This limitation may be obviated by causing the gas-filled tubes to start with the use of a separate starting electrode, since in this case, the starting voltage may be kept within much narrower limits.

In the circuit-arrangements shown in Figs. 2, 3 and 4 the gas-filled tubes $g_{1a}$, $g_{2a}$, and so on, which couple the multiple-wired points $P_1$, $P_2$, and so on of the line circuits with the multiple-wired points $Q_a$, $Q_b$ and so on of the connecting circuits $VC_a$, $VC_b$ are constructed in the form of triodes, each comprising a cold cathode $k$, an anode and a starting electrode $f$. In the circuit-arrangement shown in Fig. 2 the anodes are connected to the multiple-wired points P of the line circuits, the cathodes to the multiple-wired points Q of the connecting circuits, whereas in the circuit-arrangement shown in Fig. 3, conversely, the cathodes are connected to the points P and the anodes to the points Q.

In the circuit-arrangement shown in Fig. 2 the connecting lines of the subscribers $Ab_1$ and $Ab_2$ are connected to the ends of two identical primary windings of transformers $T_1$, $T_2$, whereas the other ends of the primary windings are connected to different terminals of a battery V. The multiple-wired points $P_1$, $P_2$ are furthermore connected through secondary windings of the transformers, in series with a resistor $R_1$, $R_2$, to the positive terminal of a supply source $Ba$ (not shown), of which the negative terminal is earthed. The starting electrodes $f$ of the gas-filled tubes $g_{1a}$, $g_{2a}$ and $g_{1b}$, $g_{2b}$ respectively, of which the anodes are connected to the same multiple-wired point $P_1$, $P_2$ of a line circuit respectively are connected through capacitors $C_{11}$, $C_{12}$, and $C_{21}$, $C_{22}$ respectively to a suitably chosen tapping of the secondary windings of the transformers and furthermore through a resistor $R_{14}$, $R_{15}$ to a tapping of a potentiometer $R_{12}$, $R_{13}$ and $R_{23}$, $R_{24}$ respectively, connected between earth and the junction $A_1$, $A_2$ of the secondary windings of the transformers to the resistor $R_1$, $R_2$.

If the subscriber $Ab_1$ takes off the receiver, the secondary winding of the transformer $T_1$ has produced across it a voltage pulse which is transmitted through the capacitors $C_{11}$, $C_{12}$ to the starting electrodes of the gas-filled tubes $g_{1a}$, $g_{1b}$, so that the potential of the starting electrodes increases and the voltage between the starting electrodes and the cathodes increases in excess of the break down voltage of the starting path, so that all the tubes coupling the point $P_1$ to a free connecting circuit may ignite. The gas-filled tubes connected to engaged connecting circuits, however, cannot ignite, because the cathodes of these tubes have been placed at a relatively positive potential due to the voltage drop in the resistors $R_a$, $R_b$ connecting the points Q of these engaged connecting circuits to earth, these voltage drops being caused by current flowing to other tubes which have been made conductive for the engaged circuits.

As soon as the starting path of any random one of the gas-filled tubes, for example $g_{1a}$, breaks down and begins to become conductive, the main discharge path between the cathode and the anode becomes conductive, so that current begins to pass through the circuit from the supply source $Ba$, through the resistor $R_1$, the secondary winding of the transformer $T_1$, the multiple-wired point $P_1$, the main discharge path of the gas-filled tube $g_{1a}$, the multiple-wired point $Q_a$, the inductor $L_a$ and the resistor $R_a$ to earth. Thus the potential of point $A_1$ and hence the potential of the starting electrodes of all of the gas-filled tubes coupled thereto will be caused to drop, whilst furthermore negative pluses are fed through the capacitors $C_{11}$, $C_{12}$ to the starting electrodes due to the discharge current flowing in $R_1$ and $T_1$, and therefore the further gas-filled tubes cannot start. The potential at the cathodes of the gas-filled tubes connected to the point $Q_a$ increases to such an extent that none of these tubes can start at a next following call. Consequently, the connecting circuit $VC_a$ is engaged.

It should be noted that the supply voltages should be chosen to be such that the main discharge path between the anode and the cathode of the tubes cannot ignite before the starting path between the starting electrode $f$ and the cathode has struck.

After the gas-filled tube has become conductive, intelligence currents can be transmitted to the connecting circuit or conversely through a transformer $T_1$ and the gas-filled tube $g_{1a}$. In order to reduce the attenuation of the intelligence currents, the resistors $R_1$, $R_2$ in the line circuits are shunted by capacitors $C_{10}$, $C_{20}$, similar to the circuit-arrangement shown in Fig. 3.

The circuit-arrangement may be varied in various ways. Thus, for example, the starting pulse, which is supplied, in the event of a call, to the starting electrode of the gas-filled tubes concerned may be taken from a point of a primary winding, instead of the secondary winding of the transformers. Instead of being connected to the same tapping, the resistors $R_{14}$, $R_{15}$, and so on may be connected to different tappings of the potentiometer $R_{12}$, $R_{13}$, so that the bias voltages of the tubes are different and one gas-filled tube starts sooner than the other.

In the circuit-arrangement shown in Fig. 3, the anodes $a$ of the gas-filled tubes are connected to the multiple-wired points of the connecting circuits and the cathodes are connected through resistors $RT_1$, $RT_2$, the purpose of which will be evident hereinafter, to the multiple-wired points P of the line circuits. The starting electrodes $f$ of the gas-filled tubes $g_{1a}$, $g_{2a}$, the anodes of which are connected to one another, are each connected to a resistor $RA_1$, $RA_2$ of the junction $D_a$ of resistor $R_a$ and inductor $L_a$. The potential of the starting electrode consequently varies with the voltage drop across the resistor $R_a$; i. e., the potential is lower in a gas-filled tube coupling a subscriber line with an engaged connecting circuit than that in a gas-filled tube coupled with a free connecting circuit.

If one of the subscribers, for example $Ab_1$, originates a call, the completion of the line loop across the subscriber's apparatus produces across the secondary winding of the tranformer $T_1$ a voltage pulse, which causes the potential of the cathodes of the tubes $g_{1a}$, $g_{1b}$ to drop. The voltage drop is limited by the rectifier $Z_1$. The voltage between the cathodes and the starting electrodes of the gas-filled tubes connected to free connecting circuits then exceeds the starting voltage. The gas-filled tubes coupled with engaged connecting circuits cannot strike, since the starting electrodes have a comparatively low potential. As soon as one of the gas-filled tubes, for example $g_{1a}$ ignites, the potential of point $P_1$ increases, since current begins to pass from the positive terminal $Ba$ of the supply source through resistor $R_a$, inductor $L_a$, gas-filled tube $g_{1a}$, resistor $RT_1$, secondary winding of transformer $T_1$ and resistor $R_1$ to earth, which prevents one of the further tubes coupled with point P from starting. Furthermore the potential drop of point $D_a$ and of the starting electrodes coupled thereto prevents one of the further gas-filled tubes connected to point $Q_a$ of the connecting circuits from starting.

After a connection has thus been established between the subscriber $Ab_1$ and the connecting circuit $VC_a$, the subscriber dials the wanted number. The dial pulses are transmitted through the transformer $T_1$ and the gas-filled tube $g_{1a}$ to the intelligence conductor $S_a$ in the connecting circuit and from there in a manner not described more fully, to the marking switch $MS_a$ (not shown). The marking switch may be of a known type and comprise, for example, a counting circuit having gas-filled tubes. In accordance with the number of incoming dial pulses, the potential of one of the outlet marking points $M_{1a}$, $M_{2a}$ or $M_{4a}$ increases.

The marking points are connected through resistors $R_{a3}$, $R_{a4}$ to the starting electrodes of the numerically corresponding gas-filled tubes connected to the multiple-wired point $Q_a$ of the connecting circuit concerned. If, for example, the digit 3 is chosen, the voltage of the marking point $M_{3a}$ increases and hence also the voltage of the starting electrode of the gas-filled tube $g_{2a}$, which couples the multiple-wired point $Q_a$ with the multiple-wired point $P_2$ associated with the subscriber $Ab_2$, to which the digit 3 corresponds. The potential of the starting electrodes increases to such an extent that the gas-filled tube $g_{2a}$ strikes, if the subscriber $Ab_2$ is free, and does not strike, if this subscriber is engaged, since in the latter case the voltage of the cathode of the tube $g_{2a}$ has a comparatively high potential. After the gas-filled tube $g_{2a}$ has struck, an intelligence connection is established between the multiple-wired points $P_1$ and $P_2$ of the subscribers across the main discharge paths of the gas-filled tubes $g_{1a}$ and $g_{2a}$ in series.

In practice it may occur that the gas-filled tube $g_{1a}$ extinguishes, as soon as the gas-filled tube $g_{2a}$ ignites, since the direct current passing through the gas-filled tube $g_{1a}$ abruptly drops very steeply.

This limitation may be obviated by including in series with the main discharge path a resistor $RT_2$ varying with temperature, the temperature coefficient of it being negative. In cold condition its resistance is comparatively high. If the tube $g_{2a}$ starts, the current passing through this tube is initially limited. Resistor $RT_2$ is gradually heated by the direct current passing through it; thus the resistance drops and the current increases, so that after a short time the resistance has assumed such a value that it causes only a small damping of the intelligence currents.

In the circuit-arrangement shown in Fig. 3 the resistors $RT_1$, $RT_2$ are included in the line circuits between the multiple-wired points $P_1$, $P_2$ and the secondary windings of the transformers. This has the advantage that each line circuit only requires one resistor. However, it is advisable to add an individual resistor varying with temperature to each gas-filled tube, it being arranged at a suitable area in the tube itself, for example it may form part of the anode. This has the advantage that the resistor is heated not only by the Joule's heat produced in the resistor itself but also by the heat produced in the tube, for example, owing to the electron bombardment, so that the resistor finally assumes a higher temperature and its resistance is lower.

After the conversation has ended, the connection is to be interrupted, i. e. the gas-filled tubes must be extinguished. This may, for example, be carried out by the pulse which is produced when the receiver is laid down, a positive pulse being produced at the multiple-wired point of the corresponding line circuit. In contradistinction to the negative pulse produced at the multiple-wired point when a call is made, this pulse is not limited by the rectifier $Z_1$, $Z_2$, which is connected between the multiple-wired point and the point N and is so high that the gas-filled tube extinguishes.

As a matter of course, it should be avoided that the gas-filled tube should extinguish during the transmission of the dial pulses from the subscriber, which would imply the risk that at the end of a dial pulse a further gas-filled tube would strike, so that a connection with a further connecting circuit would be established. This may, for example, be realized by shunting the dial contact in the subscriber set with the use of a resistor or a capacitor, so that the dial pulses are smaller in amplitude or have a slower rise time than the closing pulse, which is produced when the receiver is laid down.

A further method is to take care that the positive pulse occurring at the multiple-wired point of a line circuit is not sufficiently high to cause the gas-filled tube to extinguish and that the connecting circuit comprises a device which can make a distinction between positive pulses which are followed within a certain period by negative pulses, as is the case during the emission of dial pulses, and positive pulses which are not followed by such negative pulses, i. e. a closing pulse. The device referred to must be arranged to be such that, if the latter case occurs, an extinguishing pulse is supplied to the gas-filled tubes connected to the multiple-wired point of the connecting circuit concerned.

It has been found that in a circuit-arrangement shown in Fig. 3, in which a starting pulse is supplied to the interconnected cathodes of tubes, it may occur that, in certain conditions, two gas-filled tubes start simultaneously. If, for example, the alternating current value of the impedance connected to the point $P_1$ is comparatively low, and the alternating values of the impedances connected to the multiple-wired points $Q_a$ and $Q_b$ of the connecting circuits are comparatively high, in the first moment only a comparatively low voltage drop will occur across the impedance connected to the point $P_1$ and a great voltage drop will occur across the impedance in the connecting circuit. It may then occur that the potential of the point $P_1$ does not rise sufficiently steeply, so that a second tube also strikes. The voltage drop across the impedances connected to the cathodes of the tubes counteracts inadequately the starting pulse. If the second tube has once struck, it remains conductive.

In order to obviate this undue effect, in the pre-selector circuit-arrangement shown in Fig. 4 the starting electrodes of the tubes $g_{1a}$, $g_{1b}$ and $g_{1c}$, of which the cathodes are interconnected at the point $P_1$, are intercoupled by means of capacitors $C_{ab}$, $C_{ac}$ and $C_{bc}$. As soon as one of the tubes, for example $g_{1a}$ starts, when the subscriber $Ab$ takes off the receiver, a voltage drop is produced across the impedances $S_{a2}$, $R_a$, $C_a$, which is coupled with the starting electrode, owing to which the potential of the starting electrode drops abruptly. Thus a negative voltage pulse is transmitted through the capacitors $C_{ab}$ and $C_{ac}$ to the starting electrodes of the further tubes. The voltage drop of the starting electrode of the tubes is supported, when one of the tubes starts, by the voltage drop occurring across the impedance which is connected to the anode of this tube.

Figure 5:
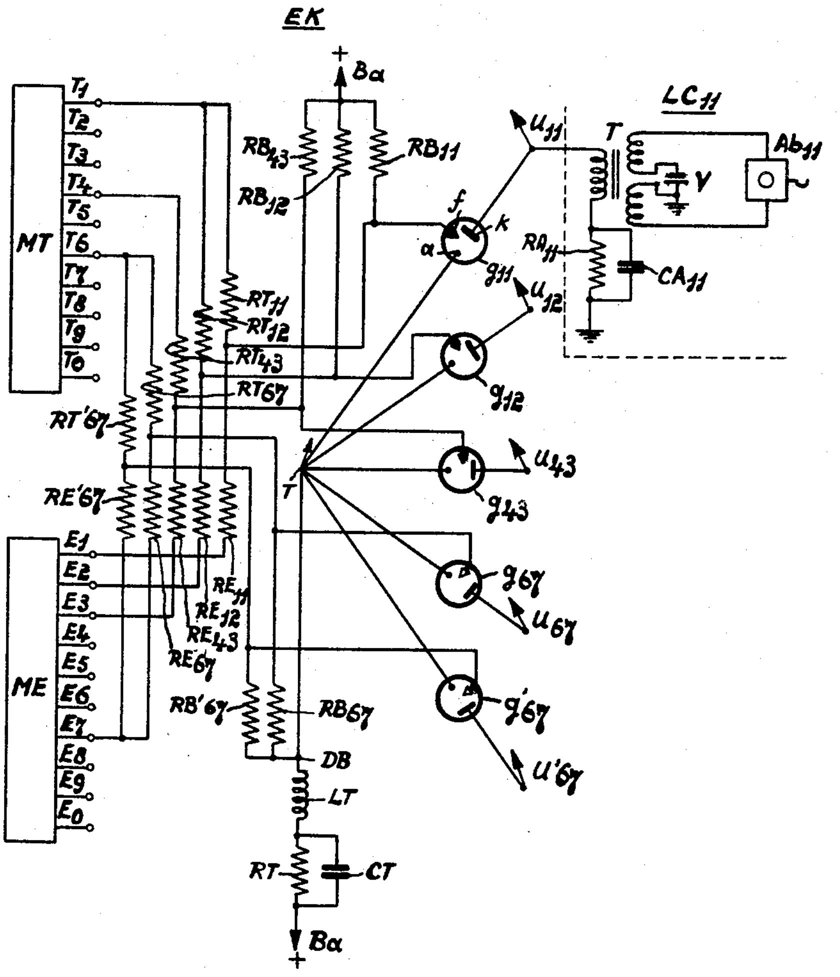
Fig. 5 shows part of a final selector circuit-arrangement, in which the lines are characterized by two digits.

Fig. 5 shows part of a final selector circuit-arrangement, with the use of which a connection can be established with a subscriber which is characterized by two digits. $U_{11}$, $U_{12}$, $U_{43}$ designate multiple-wired points of subscribers, to which correspond the numbers 11, 12 and 43 respectively, $U_{67}$ and $U'_{67}$, designating multiple-wired points of a multiple line-connection, having the common number 67.

The line circuits, of which only the line circuit LC associated with subscriber $Ab_{11}$ is shown, are arranged in a manner similar to that of the circuit-arrangement shown in Fig. 3. The multiple-wired points $U_{11}$, $U_{12}$, and so on are coupled through gas-filled tubes $g_{11}$, $g_{12}$, and so on with the multiple-wired point T of the final selector EK, the cathodes being connected to the multiple-wired points U of the line circuits and the anodes to the multiple-wired points T.

The dial pulse series characterising the decade of the subscriber called is received by a marking circuit MT and the pulse series corresponding to the unit digit is supplied to the marking circuit ME. The marking circuits, which may be of a known type, are provided with a plurality of outlet marking points $T_1$ . . . $T_0$, $E_1$ . . . $E_0$ respectively and are furthermore arranged to be such that at the reception of a pulse series the outlet marking point corresponding to the number of incoming pulses has an increase in voltage of, for example, 100 v. After the reception of one pulse at the marking circuit MT, the voltage of point $T_1$ increases. At the reception of two pulses, the voltage of point $T_2$ increases, and so forth.

The starting electrodes *f* of the gas-filled tubes $g_{11}$, $g_{12}$, and so on are connected through resistors $RT_{11}$ and $RT_{12}$ to numerically corresponding decade marking points of the marking circuit MT and furthermore through resistors $RE_{11}$ and $RE_{12}$ to the numerically corresponding unit marking point of the marking circuit ME. Thus, for example, the starting electrode of the tube $g_{43}$, which is associated with the subscriber numbered 43 is connected through resistor $RT_{43}$ to the point $T_4$, which marks decade 4 and through resistor $RE_3$ connected to the point $E_3$ marking the unit 3. In a similar manner the starting electrodes of the gas-filled tubes $g_{67}$ and $g_{67'}$, of the multiple-line group having the number 67 are connected through the resistors $RT_{67}$ and $RT_{67'}$, to point $T_6$ and through resistors $RE_{47}$ and $RE_{67'}$, to point $E_7$. The potential of the marking points $T_1$ to $T_0$ and $E_1$ to $E_0$ are, for example $-100$ v. in the position of rest of the marking circuits, whereas the potential of one of the marking points MT and ME increases to 0 volt, after a number has been chosen.

The starting electrodes of the tubes $g_{11}$, $g_{12}$, $g_{43}$ are furthermore connected through resistors $RB_{11}$, $RB_{12}$ and $RB_{43}$ to the positive terminal of the battery B*a*, the voltage of which is 140 v. against earth. These resistors serve to adjust the potential of the starting electrode to a suitable value of rest. The starting electrodes of the gas-filled tubes $g_{67}$ and $g_{67'}$ are connected through resistors $RB_{67}$ and $RB_{67'}$ to a point of the impedance LT, RT, CT connected between the multiple-wired point T and the positive terminal of the supply source B*a*.

It is assumed that the resistors RT and RE are identical with one another and are twice the resistors RB. In the position of rest of the circuit-arrangement the voltage of the starting electrodes is equal to 20 v., so that the voltage between the starting electrodes and the cathodes is considerably lower than the starting voltage of the starting path of the gas-filled tubes, which is 60 v.

If the number 11 is dialled, the voltage of the marking points $T_1$ and $E_1$ increases from $-100$ v. to earth potential. Thus the potential of the starting electrodes, which are coupled either with point $T_1$ or with point $E_1$, increases to 45 v., which is lower than the starting voltage of the gas-filled tubes. The potential of the starting electrodes of the tube $g_{11}$, which is connected both to point $T_1$ and to point $E_1$, however, increases to 70 v. This tube will consequently strike, if the subscriber $Ab_{11}$ is free, so that the wanted connection is established. However, if the subscriber is engaged, one of the other tubes connected to the multiple-wired point $U_{11}$, associated with a further final selector or a preselector is traversed by such a current that the potential of the multiple-wired point $U_{11}$ is equal to 40 v., so that the voltage of the starting path of the tube $g_{11}$ is only 30 v. and the tube cannot strike.

If the group number 67 of the multiple-line group were dialled, the potential of the starting electrodes of the tubes $g_{67}$ and $g_{67'}$ increases to 70 v., so that the tubes connected to free lines of the multiple-line group can start. However, as soon as one of the tubes strikes the potential of the point DB drops from 140 v. to 100 v., so that the potential of the starting electrodes of these tubes drops to 50 v. and the further tubes cannot strike.

Fig. 6 shows two first-group selectors which couple the connecting circuits $VC_1$ and $VC_2$ to the second-group selectors $GK_a$, $GK_b$, $GK_c$, $GK_6$ and so on. The multiple-wired points $P_1$ and $P_2$ of the connecting circuits are connected to cathodes of the gas-filled tubes $g_{1a}$, $g_{1b}$, $g_{1c}$, $g_{1d}$, $g_{2a}$, $g_{2b}$, $g_{2c}$, $g_{2d}$, respectively, whereas the multiple-wired points $Q_a$, $Q_b$, $Q_c$ and $Q_d$ of the second-group selectors are connected to the anodes of the tubes.

It is assumed that the group selectors $GK_a$ and $GK_b$ are associated with a group which is numbered 1, whereas the group selectors $GK_c$ and $GK_d$ correspond to the number 3. The starting electrodes of the gas-filled tubes $g_{1a}$ and $g_{1b}$ are coupled through resistors with the marking point $M_{11}$ of the marking circuit $MS_1$ of the connecting circuit $VC_1$; this marking point corresponds to the digit 1. Similarly the starting electrodes of the tubes $g_{1c}$ and $g_{1d}$ are coupled with the marking point $M_{13}$, whereas the starting electrodes of the gas-filled tubes $g_{2a}$, $g_{2b}$, $g_{2c}$, $g_{2d}$ are connected in a similar manner to numerically corresponding marking points of the marking circuit $MS_2$ of the connecting circuit $VC_2$. The starting electrodes are furtherfore coupled each through a resistor with a point of the impedances $L_a$, $R_a$, $L_b$, and so on, which are connected between the anodes of the tubes concerned and the positive terminal of the supply source $B_a$.

If the digit 3 is dialled through the connecting circuit $VC_1$, the potential of the marking point $M_{13}$ increases, so that the potential of the starting electrodes coupled with this point and furthermore connected to free second-group selectors increases in excess of the starting voltage. If one of the tubes strikes, the voltage of the cathodes of all tubes connected to the multiple-wire point $P_1$ increases owing to the current passing through the impedance $L_1R_1$ to such an extent that the further tubes cannot strike. The tubes connected to engaged second-group selectors cannot strike, since the potential of the multiple-wired points Q thereof has a comparatively low value, so that also the potential of the starting electrodes coupled with these points is comparatively low.

What we claim is:

1. Automatic signalling apparatus for electrically engaging a first circuit yielding intelligence signals and having a multiple point with any one of a plurality of second circuits each having a multiple point in response to an engaging action occurring at said first circuit and for establishing an intelligence conducting path between said first circuit and an engaged second circuit; said apparatus comprising a first impedance of finite direct current resistance coupled to the multiple point of said first circuit and responsive to said action to produce an engaging voltage across said first impedance, a like plurality of second impedances each coupled to the multiple point of a corresponding one of said second circuits, a like plurality of gas discharge tubes each having a distinctive ignition and operating voltage characteristic and having at least two electrodes, each of said tubes being coupled between the multiple point of said first circuit and the corresponding multiple point of one of said second circuits, a voltage source having first and second terminals and producing a voltage having a value greater than the operating voltage of any of said tubes and less than the ignition voltage of any of said tubes, means to couple said first impedance and said plurality of second impedances between the first and second terminals of said source, and means coupling one end of said first impedance to one of the electrodes of each of said plurality of tubes whereby the engaging voltage produced across said first impedance ignites solely one of said tubes and renders the remaining tubes nonconductive due to the voltage drop across said first impedance caused by the current drawn by said ignited tube thereby causing said first circuit to engage that second circuit associated with the ignited tube and establishing an intelligence conducting path through said ignited tube.

2. Apparatus, as set forth in claim 1, wherein said engaging voltage produced across said first impedance produces a voltage variation across each of said plurality of second impedances, the values of said impedances being chosen so that said variation has a value at least equal to the difference between the largest ignition voltage of any of said tubes and the voltage produced across said voltage source and less than the summation of said difference voltage and the voltage produced across said first impedance when said first circuit is engaged with any one of said second circuits.

3. Automatic signalling apparatus for electrically engaging a first circuit yielding intelligence signals and having a multiple point with any one of a plurality of second circuits each having a multiple point in response to an engaging action occurring at said first circuit and for establishing an intelligence conducting path between said first circuit and an engaged second circuit; said apparatus comprising a first impedance of finite direct current resistance coupled to the multiple point of said first circuit and responsive to said action to produce an engaging pulse across said first impedance, a rectifier coupled between the multiple point of said first circuit and a point of contact potential, said rectifier being polarized to prevent said engaging pulse from falling below a predetermined value, a like plurality of second impedances each coupled to the multiple point of a corresponding one of said second circuits, a like plurality of gas discharge tubes each having a distinctive ignition and operating voltage characteristic and having at least two electrodes, each of said tubes being coupled between the multiple point of said first circuit and the corresponding multiple point of one of said second circuits, a voltage source having first and second terminals and producing a voltage having a value greater than the operating voltage of any of said tubes and less than the ignition voltage of any of said tubes, means to couple said first impedance and said plurality of second impedances between the first and second terminals of said source, and means coupling one end of said first impedance to one of the electrodes of each of said plurality of tubes whereby the engaging voltage produced across said first impedance ignites solely one of said tubes and renders the remaining tubes nonconductive due to the voltage drop across said first impedance caused by the current drawn by said ignited tube thereby causing said first circuit to engage that second circuit associated with the ignited tube and establishing an intelligence conducting path through said ignited tube.

4. Automatic signalling apparatus for electrically engaging a first circuit yielding intelligence signals and having a multiple point with any one of a plurality of second circuits each having a multiple point in response to an engaging action occurring at said first circuit and for establishing an intelligence conducting path between said first circuit and an engaged second circuit; said apparatus comprising a first impedance of finite direct current resistance coupled to the multiple point of said first circuit and responsive to said action to produce an engaging voltage across said first impedance, a like plurality of second impedances each coupled to the multiple point of a corresponding one of said second circuits, a like plurality of gas discharge tubes each having a distinctive ignition and operating voltage characteristic and having at least two electrodes and a starting member, one electrode of each of said tubes being coupled to the multiple point of said first circuit, the other electrode of each of said tubes being coupled to the corresponding multiple point of one of said second circuits, a voltage source having first and second terminals and producing a voltage having a value greater than the operating voltage of any of said tubes and less than the ignition voltage of any of said tubes, means to couple said first impedance and said plurality of second impedances between the first and second terminals of said source, and ignition means coupling one end of said first impedance to the starting members of each of said plurality of tubes, whereby the engaging voltage produced across said first impedance ignites solely one of said tubes and renders the remaining tubes nonconductive due to the voltage drop across said first impedance caused by the current drawn by said ignited tube thereby causing said first circuit to engage that second circuit associated with the ignited tube and establishing an intelligence conducting path through said ignited tube.

5. Apparatus, as set forth in claim 4, wherein each of said plurality of gas tube circuits further includes a temperature responsive element having a negative temperature coefficient, each element being serially connected in the discharge path of the corresponding gas tube.

6. Automatic signalling apparatus for electrically engaging a first circuit yielding intelligence signals and having a multiple point with any one of a plurality of second circuits each having a multiple point in response to an engaging action occurring at said first circuit and for establishing an intelligence conducting path between said first circuit and an engaged second circuit; said apparatus comprising a first impedance of finite direct current resistance coupled to the multiple point of said first circuit and responsive to said action to produce an engaging voltage across said first impedance, a like plurality of second impedances each coupled to the multiple point of a corresponding one of said second circuits, a like plurality of gas discharge tubes each having a distinctive ignition and operating voltage characteristic and having a cathode, an anode and a starting electrode, the cathodes of said tubes being interconnected and being coupled to the multiple point of said first circuit, the anodes being coupled to respective multiple points of said second circuits, a voltage source having first and second terminals and producing a voltage having a value greater than the operating voltage of any of said tubes and less than the ignition voltage of any of said tubes, means to couple said first impedance and said plurality of second impedances between the first and second terminals of said source, and ignition means coupling one end of said first impedance to the starting electrodes of each of said plurality of tubes whereby the engaging voltage produced across said first impedance ignites solely one of said tubes and renders the remaining tubes nonconductive due to the voltage drop across said first impedance caused by the current drawn by said ignited tube thereby causing said first circuit to engage that second circuit associated with the ignited tube and establishing an intelligence conducting path through said ignited tube.

7. Apparatus, as set forth in claim 6, further including means to intercouple the starting electrodes of said tubes for alternating-currents.

8. Automatic signalling apparatus for electrically engaging a first circuit yielding intelligence signals and having a multiple point with any one of a plurality of second circuits each having a multiple point in response to an engaging action occurring at said first circuit and for establishing an intelligence conducting path between said first circuit and an engaged second circuit; said apparatus comprising a first impedance of finite direct current resistance coupled to the multiple point of said first circuit and responsive to said action to produce an engaging voltage across said first impedance, a like plurality of second impedances each coupled to the multiple point of a corresponding one of said second circuits, a like plurality of gas discharge tubes each having a distinctive ignition and operating voltage characteristic and having at least two electrodes and a starting member, one electrode of each of said tubes being coupled to the multiple point of said first circuit, the other electrode of each of said tubes being coupled to the corresponding multiple point of one of said second circuits, a voltage source having first and second terminals and producing a voltage having a value greater than the operating voltage of any of said tubes and less than the ignition voltage of any of said tubes, a transformer having a primary winding and a secondary winding, a network having a resistance shunted by a capacitance, means to couple said first impedance through said network to said secondary transformer winding, means to couple the primary transformer winding across the first and second terminals of said voltage source, and ignition means coupling one end of said first impedance to the starting members of each of said plurality of tubes, whereby the engaging voltage produced across said first impedance ignites solely one of said tubes and renders the remaining tubes nonconductive due to the voltage drop across said first impedance caused by the current drawn by said ignited tube thereby causing said first circuit to engage that second circuit associated with the ignited tube and establishing an intelligence conducting path through said ignited tube.

9. Apparatus, as set forth in claim 8, wherein said engaging action is a dialing action and wherein the character of dialing action determines which of said second circuits is engaged with said first circuit.

References Cited in the file of this patent

UNITED STATES PATENTS

| | | |
|---|---|---|
| 2,023,589 | Hersey | Dec. 10, 1935 |
| 2,152,889 | Jedrychowski | Apr. 4, 1939 |
| 2,502,415 | Bray et al. | Apr. 4, 1950 |
| 2,542,672 | Hecht | Feb. 20, 1951 |
| 2,576,097 | Bray et al. | Nov. 27, 1951 |
| 2,684,405 | Bruce et al. | July 25, 1954 |